(12) United States Patent
Kelson

(10) Patent No.: US 8,007,563 B1
(45) Date of Patent: Aug. 30, 2011

(54) WATERJET REMOVAL OF COVERINGS FROM CABLES

(76) Inventor: Arnold A. Kelson, Papillion, NE (US)

( * ) Notice: Subject to any disclaimer, the term of this patent is extended or adjusted under 35 U.S.C. 154(b) by 0 days.

(21) Appl. No.: 12/803,080

(22) Filed: Jun. 18, 2010

Related U.S. Application Data (63) Continuation-in-part of application No. 11/401,565, filed on Apr. 11, 2006, now abandoned.

(60) Provisional application No. 60/714,935, filed on Sep. 8, 2005.

(51) Int. Cl.
*C22B 15/00* (2006.01)

(52) U.S. Cl. .......................... 75/715; 264/504

(58) Field of Classification Search ................. 264/504; 75/715; 451/36
See application file for complete search history.

(56) References Cited

U.S. PATENT DOCUMENTS

| | | | | |
|---|---|---|---|---|
| 4,281,444 A | * | 8/1981 | Smith | 29/426.5 |
| 5,142,950 A | | 9/1992 | Takano et al. | 81/951 |
| 5,904,610 A | * | 5/1999 | Ciniglio et al. | 451/38 |
| 6,130,404 A | | 10/2000 | Campagna et al. | 219/121.69 |

* cited by examiner

*Primary Examiner* — Yogendra Gupta
*Assistant Examiner* — Robert J Grun
(74) *Attorney, Agent, or Firm* — James D. Welch (57) ABSTRACT

A method of impacting a flow of fluid, preferably water, onto a cable which comprises an outer jacket and a plurality of coverings on metal wires therewithin, to simultaneously remove a substantial majority of the outer jacket, and at least some of at least one of the coverings, on the metal wires.

17 Claims, 5 Drawing Sheets

WATERJET REMOVAL OF COVERINGS FROM CABLES

This Application is CIP of application Ser. No. 11/401,565 Filed Apr. 11, 2006 now abandoned; and Claims Benefit of Provisional Application Ser. No. 60/714,935 Filed Sep. 8, 2005.

TECHNICAL FIELD

The present invention relates to systems for and methods of stripping coverings, (eg. insulation and jacket materials from wires and cables and the like), and more particularly to a method which utilizes a system comprising means for impacting a flow of water, onto, for instance, a cable comprising an outer jacket and a contained plurality of wires, each thereof having an outer covering over underlying metal. The method results in simultaneous removal of the outer jacket of a cable, and at least some, of at least one covering, on at least one of the plurality of covered metal wires contained therewithin.

BACKGROUND

Recycling of materials is a growing industry. One area in which materials are available for recovery includes wires, bundles of wires, or cables etc. which comprises a covering material. The covering material, (eg. Teflon®, polyethylene, polyvinyl chloride, fluoropolymers and other polymers or the like), is valuable as is the metal encompassed thereby, however, a reliable approach to separating the covering and the underlying metal is prerequisite to achieving recycling benefits.

The present conventional approach of removing coverings from wires is to chop them into short lengths (eg. 1-2 milimeters), which has the effect of liberating the covering material from the underlying wire. The materials are then separated by various methods, such as by those which exploit the difference in particle size and density of the wire and the covering.

A Search of Patents has provided:
- U.S. Pat. No. 4,281,444 to Smith which describes use of a needle-like jet of fluid to cut into the outer jacket of a cable to allow its separation from the inner core thereof without damaging the inner core. The jacket is separated from the inner core and each is taken-up by a separate reel. Use of multiple jets is also mentioned.
- U.S. Pat. No. 5,904,610 to Cinglio et al. describes use of a flow of particles, (eg. sodium bicarbonate), carried in a gas, to chip brittle coatings off underlying metal in wires. Specifically, use of a stream of baking soda powder particles to strip hard enamel coatings by abrasion at intermediate sections while leaving underlying wire unharmed. Nozzles are positioned and oriented to provide the stream at a 45 or 90 degree angle, and the nozzles are rotated 120 degrees with respect to one another around the circumference of the wire.
- U.S. Pat. No. 5,142,950 to Takano Takahashi mentions use of a water jet to peel insulation off an intermediate section of wire, but describes use of blades to cut out and mechanically remove an intermediate portion of a covering.
- U.S. Pat. No. 6,130,404 to Campagna et al. describes use of lasers to remove plastic coating on a metal tube. Use of a jet of ultraclean water is mentioned as a means to cut and blow off a nylon coating deposited on a metal tube without affecting underlying metal.

To summarize, the known prior art describes use of blades, or needle-like jets of fluid oriented perpendicular to a cable jacket, to cut the outer jacket from an underlying core, or the use of an abrasive air jet or laser beam to remove coatings.

Even in view of the prior art, need remains for improved system and methodology for removal of an outer jacket from a cable, and at least some, of at least one covering, on at least one of a plurality of covered metal wires contained therewithin.

DISCLOSURE OF THE INVENTION

The present invention is primarily a method of simultaneously removing an outer jacket, and at least some of at least one covering on at least one of a plurality of covered metal wires contained therewithin. Said method begins with providing a system for use in simultaneously removing an outer Jacket and coverings on a plurality of metal wires contained therewithin, comprising:
 a) source of water pressurized to at least 4,000 psi;
 b) at least one nozzle for expelling water in a fan-shaped jet having elongated major and shorter minor axis lengths, and means for orienting said at least one nozzle;
 c) means for positioning a length cable which comprises an outer jacket and a plurality of coverings on a plurality of metal wires.

In use water provided from said source of pressurized water is expelled at least 4,000 psi from said at least one nozzle as a fan shaped jet and is directed to impinge onto said length of cable at an acute angle of incidence thereto, while said length of cable is secured in said means for positioning a length of cable, said acute angle-of-incidence being effected by orienting said at least one nozzle. The impact of said water with said outer jacket and plurality of coverings on said plurality of wires simultaneously causes a substantial majority of said outer jacket and at least some of at least one covering on at least one of a plurality of covered metal wires contained therewithin to be stripped from said underlying metal, at or near the location at which it impinges onto said cable.

Said method continues with:
 B) causing a length of cable to be positioned in said means for positioning a length of cable in a manner which allows it to be slid therethrough;
 C) while causing said length of cable to be slid through said means for positioning a length of cable causing said at least one nozzle to be oriented so that water ejected therefrom impinges upon said length of cable, and causing water to be ejected from said nozzle as a fan shaped jet;
to the end that interaction between said ejected water and said outer jacket simultaneously causes a substantial majority thereof, and at least some of at least one covering on at least one of said plurality of metal wires to be removed from said underlying metal, by a wedging action between said covering and said underlying metal.

A distinguishing factor is that substantial majority of the outer jacket and of coverings on at least two of the plurality of wires are simultaneously removed, and ideally a substantial majority of the outer jacket and of all the coverings on each of the plurality of wires are simultaneously removed.

Said method can further comprise the step of determining, via experiment, an optimum angle-of-incidence for at least one nozzle based on effectiveness in removing said outer jacket, and causing said at least one nozzle to be oriented at said optimum angle-of-incidence by adjusting said means for orientation of said at least one nozzle.

Said method can involve at least two nozzles being present, wherein at least two thereof are attached to a rotatable means such that during use water is ejected from at least two of said nozzles along loci which are perpendicular to or at an acute angle to the locus of the length of said cable, while said rotatable means is simultaneously caused to rotate about an axis which is substantially perpendicular to the locus of the length of said cable.

Said method can involve at least two nozzles being present, wherein said nozzles are oriented to so as to direct water onto cable at sequential locations along a length.

Said method can involve at least two nozzles being present, wherein said nozzles are oriented to so as to direct water onto said cable at sequential locations therealong at the same location on a circumference thereof.

Said method can involve at least two nozzles being present, wherein said nozzles are oriented at sequential locations therealong, but at different locations around a circumference thereof.

Said method can involve at least two nozzles being present, wherein said nozzles are oriented at the same location therealong, but at different locations around a circumference thereof.

Said method can involve at least two nozzles being present, wherein said nozzles are oriented so as to direct water onto said cable at an angle-of-incidence to the locus of the length thereof, at between 0.0 and 90 degrees.

Said method can involve at least two nozzles being present, wherein said nozzles are oriented so as to direct water onto said cable at an angle-of-incidence to the locus of the length thereof, at between 0.0 and 90 degrees or between, and wherein said angle-of-incidence for at least one nozzle is different from that of another thereof.

Said method can involve at least two nozzles being present, wherein said nozzles are oriented so as to direct water onto said cable at an angle-of-incidence to the locus of the length thereof of 45 degrees.

Said method can involve at least two nozzles being present, wherein said nozzles are oriented so as to direct water onto said cable at an angle-of-incidence to the locus of the length thereof of between 1-90 degrees, or between 90-179 degrees.

Said method can involve at least two nozzles being present, wherein said nozzles are oriented so as to direct water onto said cable at a relative angle to one another, to provide a broadened cross-sectional ejection jet profile.

It is to be understood that water is used as a preferred example, but that other liquid fluids can be substituted and applied.

It is also to be understood that the source of water can be pressurized to at least 10,000 psi, or can be pressurized to at least 20,000 psi or more, as necessary to achieve desired results.

For additional insight, it is presented that the present invention comprises a system for use in removing an outer jacket and coverings on a contained plurality of covered metal wires, (eg. a cable), from underlying metal in said covered wires, comprising:

a) source of pressurized fluid;
  b) at least one nozzle for expelling fluid, and means for adjusting the orientation of said at least one nozzle; and
  c) means for securing a length a cable comprising an outer jacket and coverings on a contained plurality of covered metal wires.

In use a fluid, (eg. water), which is chosen to meet efficacy and environmental requirements, is expelled from said at least one nozzle and directed to impinge onto said length of cable comprising an outer jacket and coverings on a contained plurality of covered metal wires at an acute angle, by adjusting the orientation of said at least one nozzle such that impact of said fluid with said coverings causes a substantial majority thereof to be stripped from said underlying metal at or near the location at which the fluid impinges onto said length of cable which comprises an outer jacket and coverings on a contained plurality of covered metal wires. When the proper acute, (ie. between 0.0 and 90 or between 180 and 90 degrees with typical applications excluding between 0.0 and 10 or between 180 and 170 degrees and with a demonstrative nominal angle being 45 degrees), angle is achieved between the jet locus and the wire, the fluid jet causes a wedging action between a coating and underlying metal. A plurality of nozzles can be oriented so as to simultaneously direct fluid onto said wire, bundle of wires or cable or the like. Importantly, at least one fluid jet is caused to be of an elongated "fan" shape. The nozzles can be positioned to direct fluid jets onto said wire, bundle of wires or cable or the like at the same location or at sequential locations along a length thereof, at the same or different locations around the circumference thereof, and the angle-of-incidence for each jet can be the same or different angles-of-incidence for different nozzles can be used.

It is disclosed that an initial prototype system was a demonstrative 4000 psi washer. A second system was constructed to test the invention, and comprised a barrel over the top of which was extended a length of wire, bundle of wires or cable or the like which comprises a covering and underlying metal. Two reels were present to provide and re-wind said length of wire, bundle of wires or cable or the like which were passed over the top of the barrel at a rate which was on the order of 60 ft./min. Said rate is demonstrative and not a limitation. A nozzle provided pressurized fluid from a source thereof, which was a demonstrative 20,000 psi diesel pump source which served to provide high pressure fluid. Exemplary details of a suitable nozzle is one that provides a fan shaped flow of fluid at an angle-of-incidence (AOI) to an exemplary wire. The fan jet was 0.005-0.007 inch wide, which is to be understood as exemplary and not limiting. Said prototype systems were configured at the University of Missouri for use in testing the concept of the present invention.

Further, typical practice provides that nozzles are oriented to eject fluid at different locations around the circumference of said cable. That is, for instance, one nozzle might be oriented to eject fluid from a side, and the other downward from the top or upward from the bottom etc. As mentioned above, another configuration provides that at least two nozzles are present and that said nozzles are oriented so as to direct fluid onto said wire, bundle of wires or cable at a relative angle to one another to provide a broadened cross-sectional ejection profile, (ie. a fan-shaped jet). The preferred fluid jet is of an elongated shape, (ie. it has a longer major and shorter minor axis in cross-section). This can result from the combining the output of two nozzles oriented to eject fluid along loci which were separated by 25 degrees, however, any approach to providing a fluid ejection of an elongated shape is to be considered equivalent and within this invention's scope. It is further to be understood that additional nozzles can also be added in any functional configuration.

In one test of the prototype system the nozzle was offset from the a cable by 0.5 inch, and the nozzle ejected fluid at 15K PSI while the cable was pulled through the ejected fluid at 60 ft/min. Upwards of 99% of the covering was shown to be removed from the underlying metal by said process. Further, as mentioned, it is to be understood that success in removal of coverings is related to the angle-of-incidence the fluid jet makes with respect to the length of cable, and, it is noted that a plurality of fluid jets can be oriented at offset angles with respect to one another so that fluid approaches many locations around the circumference of the length of cable. The angle-of-incidence is important as when it is appropriate it causes a "wedging" action between the underlying wire and the coating being removed, and use of a fan-shaped jet at the wedging angle provides further benefit. Again, the ejected fluid is preferably of a fan shape, and optimum application thereof provides that the plane of the elongated shape approach the length of cable which comprises an outer jacket and coverings on underlying metal wires at an optimum angle-of-incidence (AOI). The system of the present invention then provides for adjusting the (AOI) to allow experimental determination of an optimum (AOI). It is disclosed that the fluid can be of any flowable composition. Specifically water is disclosed as the preferred fluid. The fluid can be at any functional temperature, with a limitation being based in safety concerns, such as damage to materials, which might pose a health threat. A specific non-liquid fluid possibility includes dry-ice crystals.

It is also disclosed that the present invention can be applied to other than length of cable which comprises a covering and underlying metal, such as electronic parts, (eg. from old computers and other electronic equipment), and old tires. That is, any item which is composed of different layers of different hardness can be separated by streams of fluids where the appropriate pressure, angle-of-incidence (AOI), nozzle design etc. are applied.

It is noted that where a cable has an outer jacket which surrounds a plurality of wires that each have a separate coating, different jet shapes and pressures of application can be utilized. For instance, one jet might be round and another simultaneously applied jet can be of a fan shape.

Importantly, one or more fluid, (eg. water is preferred), jets can be ejected onto a cable at about 10K-20K PSI to remove an outer jacket, and simultaneously remove coatings on wires therewithin.

Where a tangle of tangled mass is to be processed, multiple nozzles can be present and caused to eject fluid along a locus which was substantially perpendicular to plane in which is the tangle of wire, while a rotatable means to which they are attached is simultaneously caused to rotate about an axis which is also substantially perpendicular to the tangled mass. Note, while the tangled mass is not oriented in an elongated manner per se., it is to be considered to be a length of cable which comprises a covering and underlying metal, for the purposes of Claim interpretation.

The invention will be better understood by reference to the Detailed Description of this Specification, in conjunction with the Drawings.

SUMMARY OF THE INVENTION

It is therefore an objective of the present invention to provide methodology for simultaneously removing an outer jacket from a cable, and at least some of at least one covering, on a plurality of contained wires (W) contained therewithin, which each comprise lengths of underlying metal (M) with coverings (WC) thereupon.

Other objectives of the present invention will become apparent by a reading of the Specification and Claims.

BRIEF DESCRIPTION OF THE DRAWINGS

FIGS. 2, 3, 4a1, 4a2, 4b and 4c demonstrate a more detailed system for practicing the present invention.

DETAILED DESCRIPTION

Figure 1:
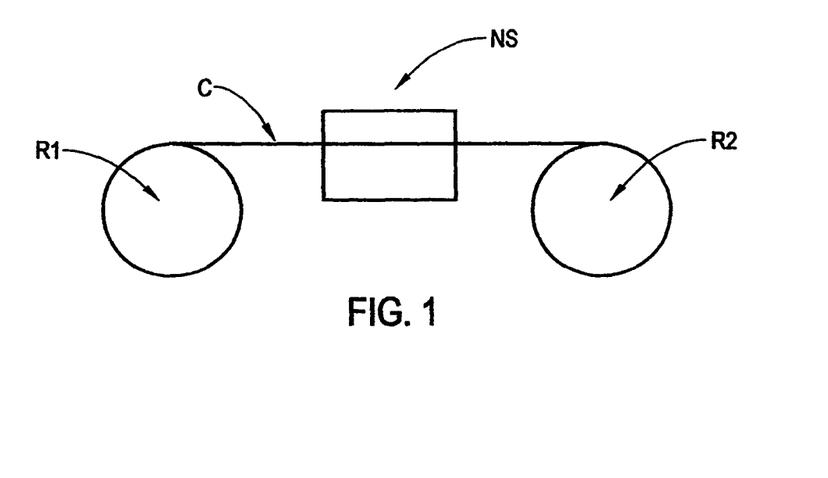
FIG. 1, there is shown a demonstrative system for practicing the present invention.

Turning now to FIG. 1, there is shown a demonstrative system for practicing the present invention. Shown are a first source reel (R1) for providing a length cable (C) which comprises at least one covering and an underlying metal, and a second take-up reel (R2) separated by a region in which is positioned a nozzle system (NS).

Figure 2:
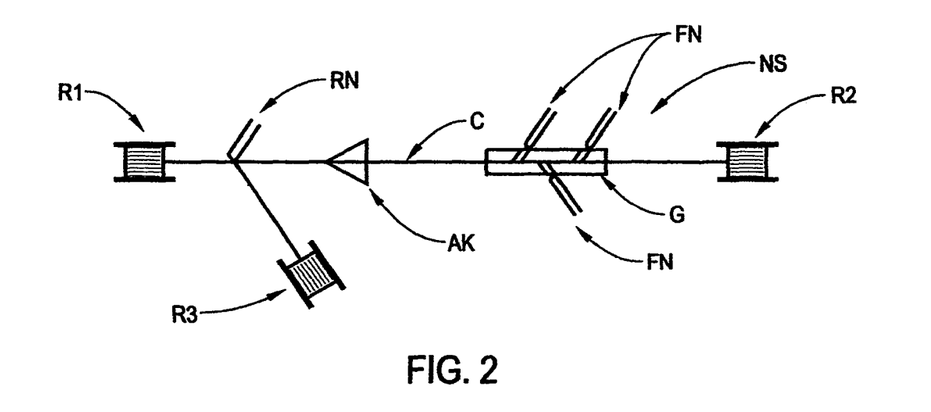
Figure 3:
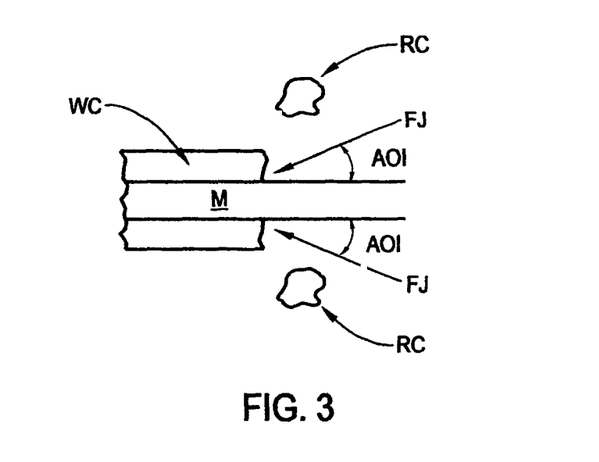
Figure 4A:
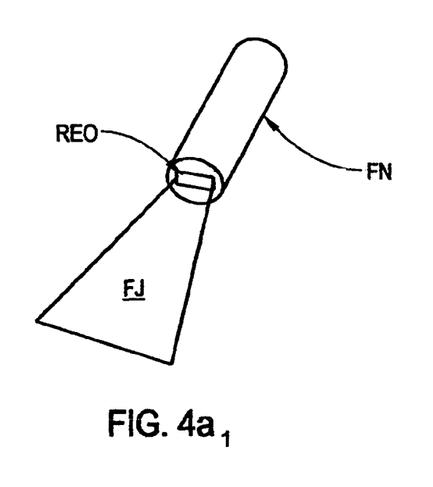
Figure 4A:
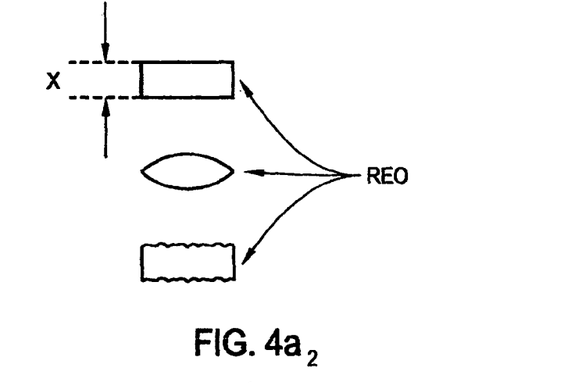
Figure 4B:
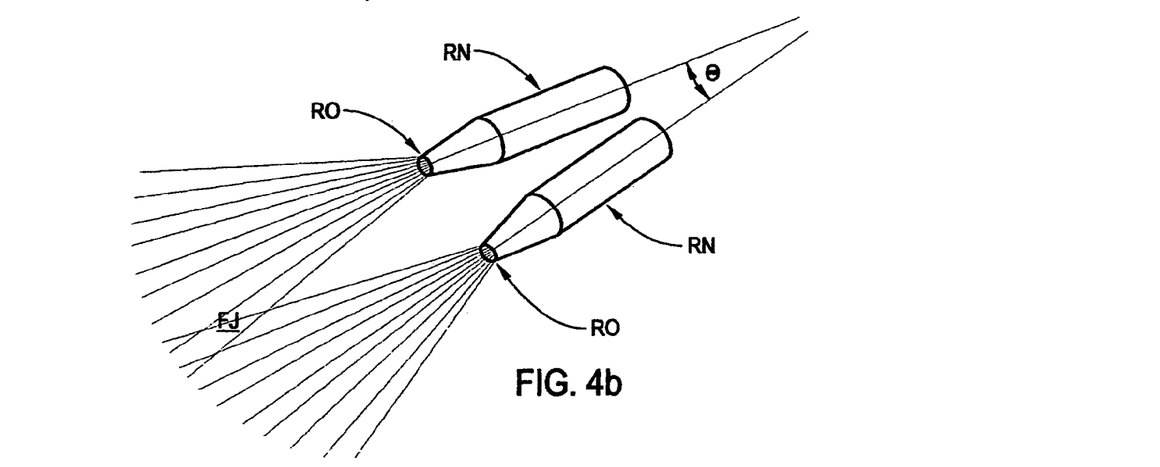
Figure 4C:
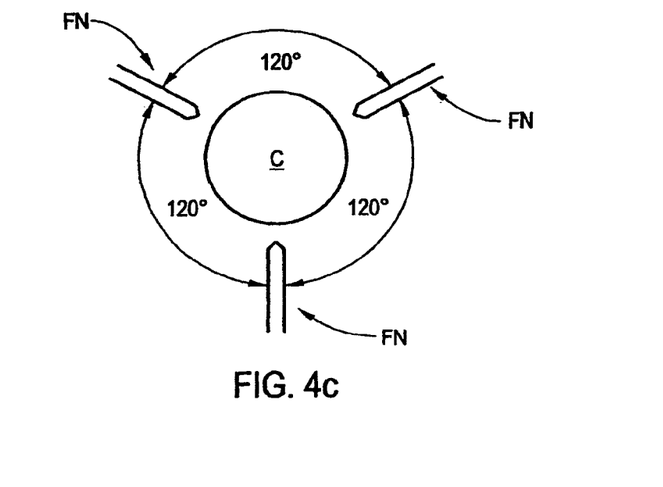

FIGS. 2, 3, 4a1, 4a2, 4b and 4c demonstrate a more detailed system for practicing the present invention. Shown again in FIG. 2 are the first source reel (R1) for providing a length of wire, bundle of wires or cable or the like (C) which comprises a covering (WC) and underlying metal (M), and a second take-up reel (R2) separated by a region in which is positioned a nozzle system (NS). Also shown are a round nozzle (RN) for slitting a jacket (J), and a third reel (R3) for accumulating removed jacket (J). Also indicated is an air knife (AK) or conical shaver to remove remaining jacket (J). Further indicated is a guide (G) for positioning the length of wire, bundle of wires or cable or the like therewithin, and for allowing fan nozzles (FN) to provide a fan shaped fluid, (eg. water), jet (FJ) thereto via openings in said guide (G). FIG. 4c indicates that the fan jets can be oriented at 120 degrees with respect to one another around the circumference of the length of wire, bundle of wires or cable or the like. Note also that, as shown in FIG. 3, the angle-of-incidence (AOI) at which a fluid, (eg. water), jet (FJ) approaches the length cable (C) is acute, and serves to remove a coating (WC) thereon as removed coating (RC) from underlying metal (M) by a wedging action. FIGS. 4a1 and 4b show approaches to forming a fan jet (FJ). FIG. 4a1 shows a fan nozzle (FN) which comprises a rectangular shaped nozzle outlet (REO), and FIG. 4b shows two round nozzles (RN) with non-rectangular, (eg. round) outlets (RO).

It is to be appreciated that the present invention is found primarily in the use of fan jets (FN) as demonstrated in FIGS. 4a1 and 4b, which are applied to at acute angles-of-incidence (AOI) to a length of wire, bundle of wires or cable or the like (C) to remove a coating (WC) from an underlying metal (M). FIG. 4a2 shows that the rectangular shaped nozzle outlet (REO) can be of various generally rectangular shapes. Note that a typical non-limiting width "x" in FIG. 4a2 can be between 0.005-0.007 inch. It is mentioned that FIG. 2 identifies a guide (G) as present, but it need not be used, as generally indicated in FIG. 3. It is also noted that a typical non-limiting offset of a fan nozzle (FN) from the coating (WC) length of wire, bundle of wires or cable or the like (C) is about 0.5 inch.

Figures 5A, 5B:
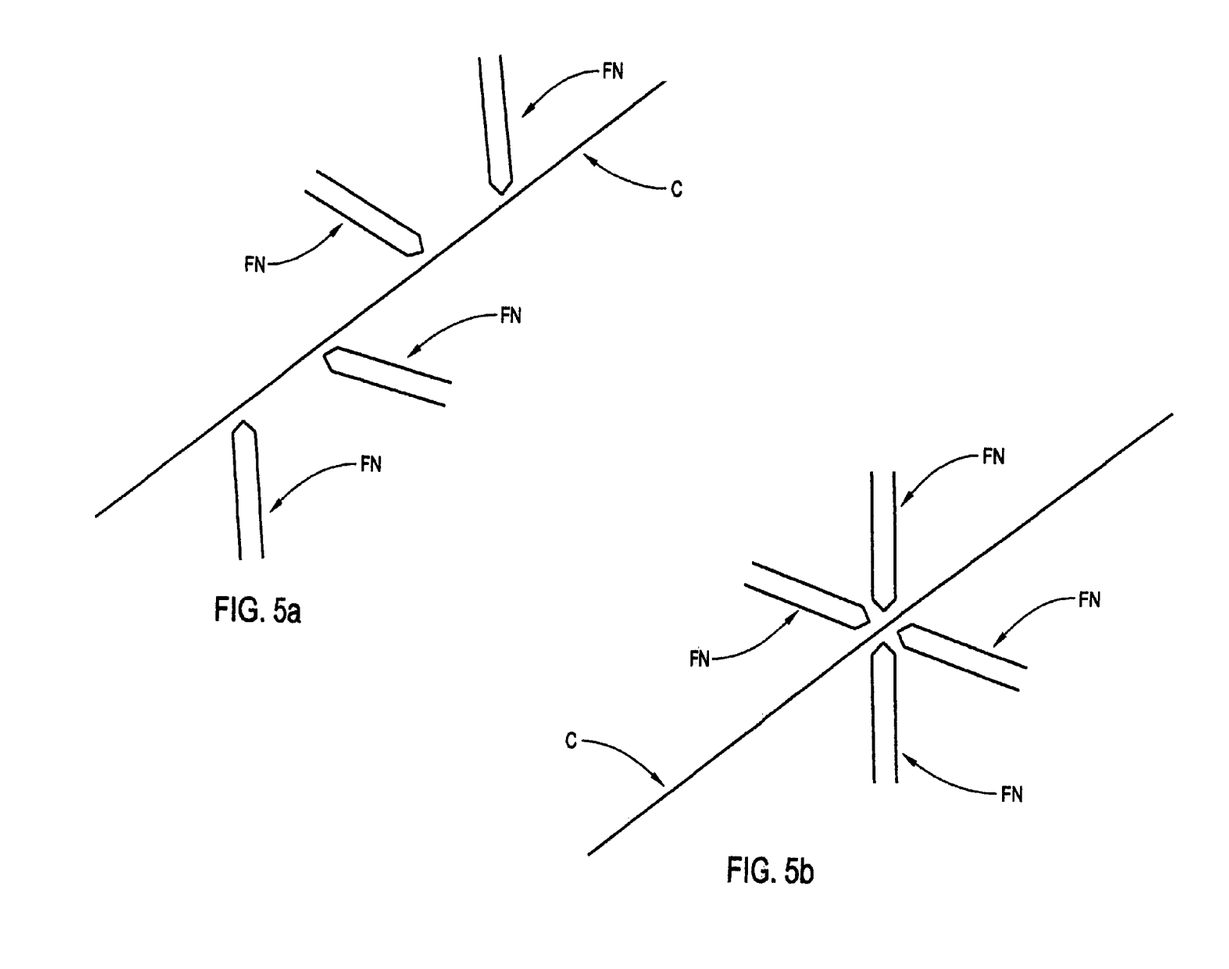
FIGS. 5a-5e demonstrate variations on the general theme of applying fan jet nozzles.
Figure 5C:
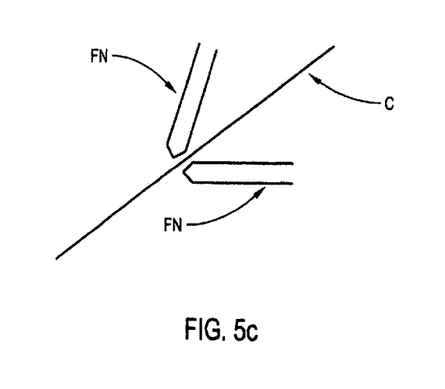
Figure 5D:
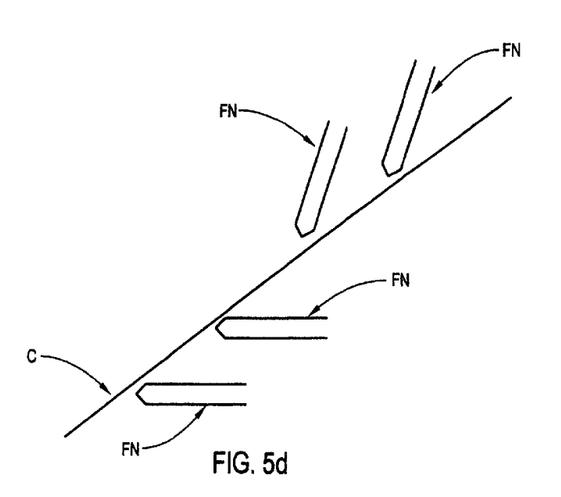
Figure 5E:
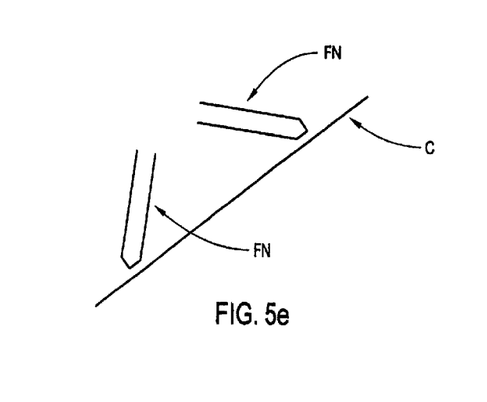

As alluded to, the focus of the present invention is in the application of fan jets (FJ) of fluid, (eg. water), applied at acute angles to a length of wire, bundle of wires or cable or the like (C) to remove a coating (WC) thereon from an underlying metal (M). FIGS. 5a-5d demonstrate variations on the general theme of applying fan jet nozzles. FIGS. 5a and 5b show a plurality of fan nozzles sequentially and simultaneously, respectively, positioned along a length of wire, bundle of wires or cable or the like (C). Said fan nozzles (FN) are shown oriented at near 90 degrees to said length of wire, bundle of wires or cable or the like (C), but it should be understood that any acute angle-of-incidence is implied thereby as generally indicated by FIGS. 5c and 5d. Also note that FIG. 5e demonstrates that a fan nozzle can be oriented at an acute angle between 180-90 degrees as well as between 0.0-90 degrees.

It is noted that applying the process of the present invention to a length of wire, bundle of wires or cable or the like which comprises a covering and underlying metal (C) using a fluid, (water), jet (FJ) of an elongated shape, (ie. it has a longer major and shorter minor axis in cross-section which is the result of combining the output of two nozzles oriented to eject fluid, (eg. water), along loci which were separated by 25 degrees), wherein the fan nozzle (FN) was offset from the (C) by 0.5 inch, and the nozzle ejected fluid, (eg. water), at 15K PSI while the (C) was pulled through the ejected fluid at 60 ft/min, resulted in upwards of 99% of the covering being removed from the underlying metal by the process in testing. It is noted that any approach to providing a fluid, (eg. water), ejection of an elongated shape is to be considered equivalent and within this invention's scope. Further, it is again noted that success in removal of coverings is related to the angle-of-incidence (AOI) the fluid jet makes with respect to the length of cable (C), and, it is noted that a plurality of fluid, (water), jets can be oriented at rotated angles with respect to one another so that fluid approaches many locations on the circumference of thereof. The angle-of-incidence (AOI) is important as when it is appropriate it causes a "wedging" action between the underlying wire and the coating being removed.

Figure 6:
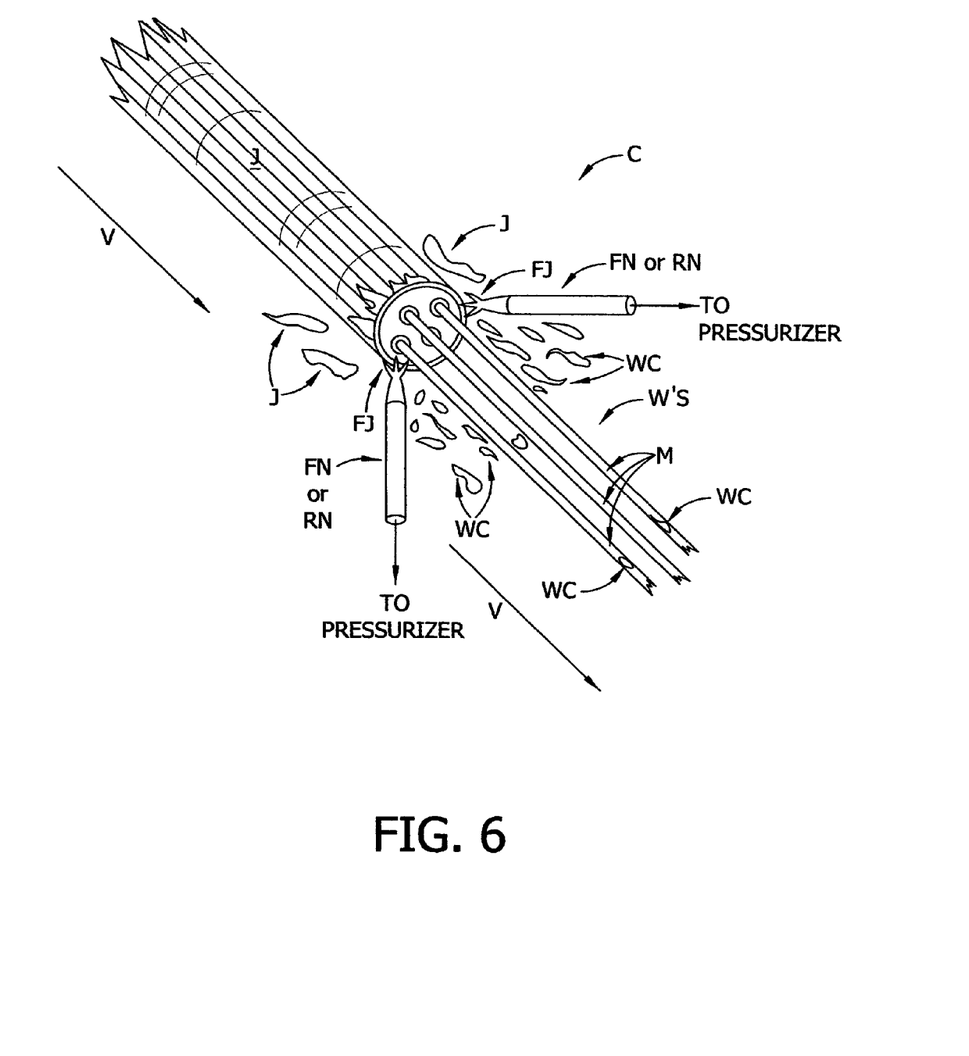
FIG. 6 demonstrates a system applied to remove an outer jacket (J) from a cable, and at least some of at least one covering on a plurality of contained wires contained therewithin.

FIG. 6 demonstrates a system applied to remove an outer jacket (J) from a cable (C), and at least some of at least one covering (WC) on a plurality, (shown as a non-limiting two pair of wires but to be interpreted to represent any number), of contained metal (M) wires contained therewithin. Note that (V) indicates that the cable (C) is pulled to the right, as shown, at some velocity while a water jet (FJ) is caused to exit at least one nozzle (FN) (RN) and impinge on the cable (C) at some pressure. It is believed that the combination of providing and using a fan shaped, (see FIGS. 4a1 and 412), water jet which is caused to be oriented at an acute angle-of-incidence, as demonstrated in FIG. 2, (which angle-of-incidence can be experimentally determined and implemented in use), to the locus of length of cable so that a wedging action effects removal of a jacket (J) and one or more coverings (WC) from underlying metal (M) in contained wires, is new, non-obvious and provides utility. This is particularly true where a present invention system is applied to simultaneously remove an outer jacket (J) from a cable (C), and at least some of at least one covering (WC), on a plurality of contained wires contained therewithin, each of which wires comprise lengths of underlying metal (M) with coverings (WC) thereupon. Note that while most of the coatings (WC) on the wires (W) are removed, some amount can remain. At a sufficiently high water jet pressure, (eg. 10,000 to 20,000 PSI), and slow enough cable velocity (V), (eg. 60 Ft/Sec or less), substantially all wire coatings can be simultaneously removed.

It is noted that a cable (C) can comprise an outer jacket (J), and anywhere from two pair to thirty-six pair or more metal (M) wires having coatings (WC) thereupon.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

I claim:

1. A method of simultaneously removing an outer jacket, and a substantial majority of at least two coverings, on at least two of a plurality of covered metal wires contained there within, comprising:
   A) providing a system for use in simultaneously removing an outer jacket and coverings on a plurality of metal wires contained there within, comprising:
      a) source of water pressurized to at least 4,000 psi;
      b) at least one nozzle for expelling water in a jet, and means for orienting said at least one nozzle;
      c) means for positioning a length cable which comprises an outer jacket and a plurality of coverings on a plurality of metal wires;
   B) causing a length of cable to be positioned in said means for positioning a length of cable in a manner which allows it to be slid through said means;
   C) while causing said length of cable to be slid through said means for positioning a length of cable, causing said at least one nozzle to be oriented so that water ejected therefrom impinges upon said length of cable, and causing water to be ejected from said nozzle as a jet;
   such that, in use, water provided from said source of pressurized water is expelled at a pressure of at least 4,000 psi from said at least one nozzle as a jet and is directed to impinge onto said length of cable at an acute angle of incidence thereto, while said length of cable is secured in said means for positioning a length of cable, said acute angle-of-incidence being effected by orienting said at least one nozzle;
   wherein the impact of said water with said outer jacket and said plurality of coverings on said plurality of wires simultaneously causes a substantial majority of said outer jacket and said coverings on at least two of a plurality of covered metal wires contained there within to be simultaneously removed from said underlying metal, at or near the location at which it impinges onto said cable, by a wedging action between said covering and said underlying metal.

2. A method as in claim 1, in which a substantial majority of the outer jacket and of all the coverings on each of the plurality of wires are simultaneously removed.

3. A method as in claim 1, which further comprises the step of determining, via experiment, an optimum angle-of-incidence for at least one nozzle based on effectiveness in removing said outer jacket, and causing said at least one nozzle to be oriented at said optimum angle-of-incidence by adjusting said means for orientation of said at least one nozzle.

4. A method as in claim 1, in which at least two nozzles are present and in which at least two thereof are attached to a rotatable means such that during use water is ejected from at least two of said nozzles along loci which are perpendicular to or at an acute angle to the locus of the length of said cable, while said rotatable means is simultaneously caused to rotate about an axis which is substantially perpendicular to the locus of the length of said cable.

5. A method as in claim 1, in which at least two nozzles are present and in which said nozzles are oriented to so as to direct water onto cable at sequential locations along a length.

6. A method as in claim 1, in which at least two nozzles are present and in which said nozzles are oriented to so as to direct water onto said cable at sequential locations therealong at the same location on a circumference thereof.

7. A method as in claim 1, in which at least two nozzles are present and in which said nozzles are oriented at sequential locations therealong, but at different locations around a circumference thereof.

8. A method as in claim 1, in which at least two nozzles are present and in which said nozzles are oriented at the same location therealong, but at different locations around a circumference thereof.

9. A method as in claim 1, in which at least two nozzles are present and in which said nozzles are oriented so as to direct water onto said cable at an angle-of-incidence to the locus of the length thereof, at between 0.0 and 90 degrees.

10. A method as in claim 1, in which at least two nozzles are present and in which said nozzles are oriented so as to direct water onto said cable at an angle-of-incidence to the locus of the length thereof, at between 0.0 and 90 degrees or between, and wherein said angle-of-incidence for at least one nozzle is different from that of another thereof.

11. A method as in claim 1, in which at least two nozzles are present and in which said nozzles are oriented so as to direct water onto said cable at an angle-of-incidence to the locus of the length thereof of 45 degrees.

12. A method as in claim 1, in which at least two nozzles are present and in which said nozzles are oriented so as to direct water onto said cable at an angle-of-incidence to the locus of the length thereof of between 1-90 degrees, or between 90-179 degrees.

13. A method as in claim 1, in which at least two nozzles are present and in which said nozzles are oriented so as to direct water onto said cable at a relative angle to one another, to provide a broadened cross-sectional ejection jet profile.

14. A method as in claim 1, in which at least two nozzles are present and in which one thereof provides a substantially round water jet and another provides a fan shaped water jet.

15. A method as in claim 1, in which the source of water pressurized to at least 10,000 psi.

16. A method as in claim 1, in which the source of water pressurized to at least 20,000 psi.

17. A method of simultaneously removing an outer jacket, and at least some of at least two coverings on at least two of a plurality of covered metal wires contained therewithin, comprising:

A) providing a system for use in simultaneously removing an outer jacket and coverings on a plurality of metal wires contained therewithin, comprising:
   a) source of fluid pressurized to at least 4,000 psi;
   b) at least one nozzle for expelling fluid in a jet having an elongated major and shorter minor axis lengths, and means for orienting said at least one nozzle;
   c) means for positioning a length cable which comprises an outer jacket and a plurality of coverings on a plurality of metal wires;
such that in use fluid provided from said source of pressurized fluid is expelled at least 4,000 psi from said at least one nozzle as a fan shaped jet and is directed to impinge onto said length of cable at an acute angle of incidence thereto, while said length of cable is secured in said means for positioning a length of cable, said acute angle-of-incidence being effected by orienting said at least one nozzle;
such that impact of said fluid with said outer jacket and plurality of coverings on said plurality of wires simultaneously causes a substantial majority of said outer jacket and of at least two coverings on at least two of a plurality of covered metal wires contained therewithin to be stripped from said underlying metal, at or near the location at which it impinges onto said cable;
   B) causing a length of cable to be positioned in said means for positioning a length of cable in a manner which allows it to be slid therethrough;
   C) while causing said length of cable to be slid through said means for positioning a length of cable causing said at least one nozzle to be oriented so that fluid ejected therefrom impinges upon said length of cable, and causing fluid to be ejected from said nozzle as a fan shaped jet;
such that interaction between said ejected fluid and said outer jacket simultaneously causes a substantial majority thereof, of at least two coverings on at least two of said plurality of metal wires to be removed from said underlying metal, by a wedging action between said covering and said underlying metal.

\* \* \* \* \*